April 3, 1934.  B. VON OBERSTADT  1,953,575

ADJUSTING MEANS AND METHOD FOR BRAKES OF AUTOMOBILES

Filed April 4, 1932

BOPP von OBERSTADT
INVENTOR

ATTORNEYS

Patented Apr. 3, 1934

1,953,575

UNITED STATES PATENT OFFICE 1,953,575

ADJUSTING MEANS AND METHOD FOR BRAKES OF AUTOMOBILES

Bopp von Oberstadt, Berlin-Halensee, Germany, assignor of one-half to Franz Liebhold, Berlin-Halensee, Germany Application April 4, 1932, Serial No. 603,170
In Germany April 4, 1931

10 Claims. (Cl. 188—72)

I am aware that, in automobile brakes with two cheeks engaging a drum at its interior periphery, it is well known to introduce an arcuated stencil member through an arcuated slot of the side wall of the drum, for examining, if the air gas adjusted by other means has exactly the desired size and if the air gaps are identical at the two brake cheeks.

The invention relates to a well known brake arrangement comprising an intermediate braking ring connected with the brake drum and two annular outer discs adapted to be pressed from opposite sides against the intermediate ring. According to the invention the means for adjusting the air gaps consists in interposed leaves or layers composed of a material capable of being worn out easily such as paper or cardboard. Such leaves or layers are distributed in equal distances or uniformly along the peripheries of the friction faces.

According to the invention the method for using such leaves or layers consists in that the two annular outer discs and the intermediate ring together with the interposed leaves or layers are tightly compressed to form an aggregate which is mounted as a whole within the drum, and that the interposed leaves or layers are worn out during the first start of the vehicle.

It is very important that the aggregate consisting of the two annular compression discs, the intermediate braking ring and the interposed leaves or layers tightly compressed in the axial direction, is a unity which may be mounted within the braking drum already connected to the wheel to be braked. According to a preferred arrangement the intermediate braking ring is secured within the braking drum by spreading which is done in such a relative position of said parts that, after the leaves or layers being worn out during the start of the vehicle, the two pressing discs attain the same air gaps equal to the original width of the leaves or layers, no mechanical adjusting or examining means being required.

Instead of consisting in several pieces arranged around the periphery in equal distances, the intermediate layer may be formed as an annular sheet of a material capable of being easily worn out such as paper or cardboard.

For instance I have shown in the drawing an arrangement comprising several leaves distributed all round upon the friction face of either pressing disc.

Figure 1:
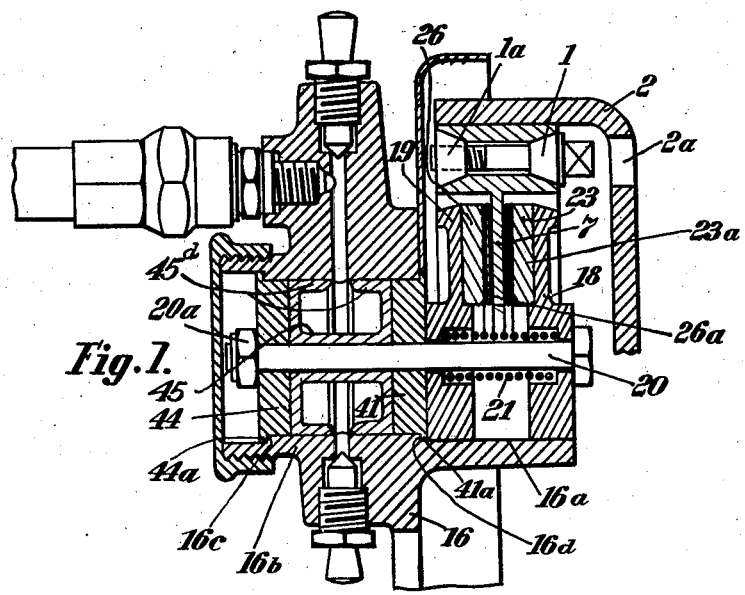
Figure 1 is a radial sectional view of an oil pressure brake and shows one of the braking cylinders disposed all-round and the section of the used cardboard leaves.

The carrying disc 16 has a cylindrical peripheral face 16a and carries upon said face the two annular pressing discs 18 and 19 which are prevented from turning by a well known arrangement not shown. The carrying disc is lengthened and forms a cylinder 16b. Such cylinders 16b are only on three pieces on the whole periphery of the disc 16. These 3 cylinders are founded in one and the same distance. Within each cylinder an outer piston 44 and an inner piston 41 are reciprocable in axial direction.

The annular discs 18 and 19 are separated from each other by several springs 21 encircling each a bolt 20 arranged centrically to the cylinder 16b, the springs 21 being disposed all-round in the same manner as the cylinders 16b. A double rubber packing-collar encloses with its tubular rod 45 the larger part of the bolt 20 and lies close with each disc shaped part to the pistons 41 and 44. The rubber-packing collar is integral with the tightening flange 45.

The friction linings or leatherings 23 and 26 of the pressing discs 18 and 19 and the braking ring are disposed radially outward from the bolts 20.

Figure 2:
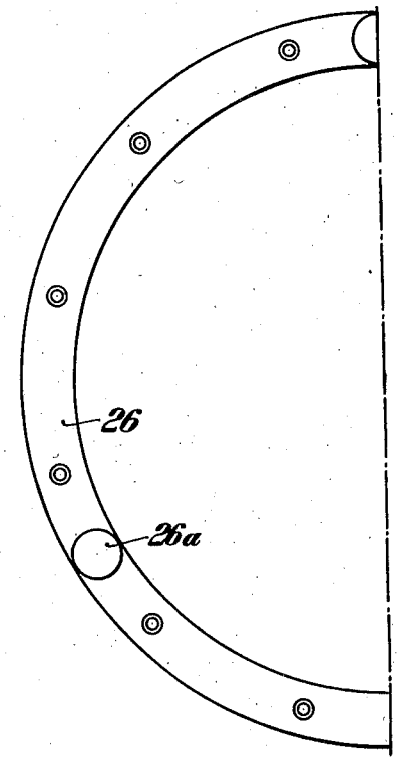
Figure 2 is the front view of one of the linings or leatherings of either pressing disc, seen from the interior side.

Figure 2 is the front view of the one half of the lining or leathering 26 seen from the interior side. This lining or leathering carries, pasted on it, paper leaves 26a disposed all-round in equal distances. The lining or leathering 23 is provided with similar leaves 23a.

The aggregate consisting of the two pressing discs 18, 19, the braking ring 7 and the carrying disc 16, held together by the nut 20a of the bolt 20 being tightened so that flanges 44a, 41a of the pistons 44, 41 are pressed against shoulders 16c, 16d of the cylinder 16b, is delivered to the purchaser of great multitudes, that is to say, to the factory of automobiles. Said purchaser mounts the delivered aggregate within the brake drum 2 mounted already in the vehicle and tightens the conical screw 1 carrying the conical nut 1a prevented from turning by gripping through a hole 2a provided in the brake drum 2. Thereby the slotted brake ring 7 is spread and thereby secured within the drum 2. Thereupon the vehicle is driven over a distance equal to approximately fifty yards, the braking system being tightened. Thereby the leaves 23a and 26a, being prevented from turning together with the carrying disc 16, rub on the braking ring 7 running together with the braked wheel, whereby the friction labour is transformed in caloric energy and concentrated in the small mass of the leaves, said leaves and the linings or leatherings 23 and 26 being bad conductors of heat. Consequently the leaves become so hot that they burn and disappear practically. Thereupon the linings or leatherings 23 and 26 are distanced from the braking ring 7 for the thickness of the disappeared leaves, that is to say for equal small determined distances. Thereby the contacting of the pressing discs with the braking ring is prevented in reliable manner.

Instead of paper or cardboard, a preferred other material resistant against a single compression, but rapidly wearing out during rubbing motion, may be used.

Should (after driving the vehicle for a distance of approximately twenty to forty thousand miles) the brake linings or leatherings be consumed, new linings or leatherings are secured upon the dismounted pressing discs 18 and 19, these new linings or leatherings having also leaves disposed all-round or a layer extending all-round their peripheries.

At the first mounting the intermediate leaves or layers may be secured also upon the braking ring 7.

What I claim is:—

1. Adjusting means for brakes of automobiles, comprising an intermediate braking ring connected with a brake drum and two annular discs prevented from turning and adapted to be pressed from opposite sides against the intermediate ring, this means consisting of leaves interposed between the ring and either disc in equal peripheral distances and composed of a material capable of being worn out easily such as paper or cardboard.

2. Adjusting means for brakes of automobiles, comprising an intermediate braking ring connected with a brake drum and two annular discs prevented from turning and adapted to be pressed from opposite sides against the intermediate ring, this means consisting of annular layers interposed between the ring and either disc and composed of a material capable of being worn out easily such as paper or cardboard.

3. Means according to claim 1, the leaves being pasted upon either pressing disc.

4. Means according to claim 1, the leaves being pasted upon the intermediate braking ring.

5. Means according to claim 2, the annular layers being pasted upon either pressing disc.

6. Means according to claim 2, the annular layers being pasted upon the intermediate braking ring.

7. Adjusting method for brakes of atuomobiles consisting in that the two annular outer discs and the intermediate braking ring together with the interposed leaves according to claim 1 are tightly compressed to form an aggregate which is mounted as a whole within the drum and the interposed leaves are worn out during the first start of the vehicle.

8. Adjusting method for brakes of automobiles consisting in that the two annular outer discs and the intermediate braking ring together with the interposed layers according to claim 2 are tightly compressed to form an aggregate which is mounted as a whole within the drum and the interposed layers are worn out during the first start of the vehicle.

9. Aggregate comprising two annular outer discs with brake linings, an intermediate braking ring and leaves interposed between brake linings and intermediate braking ring all being pressed tightly together.

10. Aggregate comprising two annular outer discs with brake linings, an intermediate braking ring and layers interposed between brake linings and intermediate breaking ring, all being pressed tightly together.

BOPP von OBERSTADT.